(12) United States Patent
Wichgers et al.

(10) Patent No.: US 7,551,988 B1
(45) Date of Patent: Jun. 23, 2009

(54) METHOD OF SOFTWARE DEFINED RADIO (SDR) WAVEFORM/FUNCTION MANAGEMENT

(75) Inventors: Joel M. Wichgers, Urbana, IA (US); Demetri Tsamis, Cedar Rapids, IA (US); Terrence L. Leier, Marion, IA (US); Gregory A. Arundale, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 11/398,095

(22) Filed: Apr. 5, 2006

(51) Int. Cl.
*G01C 23/00* (2006.01)

(52) U.S. Cl. .................. 701/3; 701/36; 701/47; 340/853.2; 340/870.01; 340/870.11; 340/870.25; 340/870.26; 340/825; 340/825.01; 340/2.1; 340/2.24; 340/2.26; 342/175; 342/199; 342/200; 342/205; 370/344; 375/219; 375/220; 375/223

(58) Field of Classification Search .................. 439/247, 439/571; 206/427; 701/3, 36, 47; 455/507, 455/418, 419, 414, 510, 515, 466, 98–99, 455/556, 517; 370/344; 375/219, 220, 223; 340/853.2, 870.01, 870.11, 870.25, 870.26, 340/825, 825.01, 2.1, 2.24, 2.26; 342/175, 342/199, 200, 205

See application file for complete search history.

(56) References Cited

U.S. PATENT DOCUMENTS

| | | | | |
|---|---|---|---|---|
| 3,636,453 | A * | 1/1972 | George | 455/19 |
| 6,052,600 | A * | 4/2000 | Fette et al. | 455/509 |
| 6,072,994 | A * | 6/2000 | Phillips et al. | 455/84 |
| 6,154,658 | A * | 11/2000 | Caci | 455/466 |
| 6,181,734 | B1 * | 1/2001 | Palermo | 375/219 |
| 6,219,562 | B1 * | 4/2001 | Williams | 455/561 |
| 6,526,110 | B1 * | 2/2003 | Bao et al. | 375/372 |
| 6,574,476 | B1 * | 6/2003 | Williams | 455/452.1 |
| 6,914,876 | B2 * | 7/2005 | Rotstein et al. | 370/210 |
| 7,177,662 | B2 * | 2/2007 | Trachewsky et al. | 455/552.1 |
| 7,280,810 | B2 * | 10/2007 | Feher | 455/137 |
| 7,430,190 | B2 * | 9/2008 | Luo et al. | 370/334 |
| 7,444,166 | B2 * | 10/2008 | Sahota | 455/553.1 |
| 2003/0125040 | A1 * | 7/2003 | Walton et al. | 455/454 |
| 2003/0144034 | A1 * | 7/2003 | Hack et al. | 455/566 |
| 2004/0116140 | A1 * | 6/2004 | Babbar et al. | 455/517 |
| 2004/0165568 | A1 * | 8/2004 | Weinstein | 370/344 |
| 2006/0015674 | A1 * | 1/2006 | Murotake | 711/101 |
| 2006/0071851 | A1 * | 4/2006 | Graas et al. | 342/357.14 |
| 2006/0121946 | A1 * | 6/2006 | Walton et al. | 455/561 |
| 2006/0135195 | A1 * | 6/2006 | Leinonen et al. | 455/550.1 |
| 2006/0206582 | A1 * | 9/2006 | Finn | 709/217 |
| 2006/0267167 | A1 * | 11/2006 | McCain | 257/678 |
| 2007/0030116 | A1 * | 2/2007 | Feher | 340/5.53 |
| 2007/0032220 | A1 * | 2/2007 | Feher | 455/404.1 |
| 2007/0032246 | A1 * | 2/2007 | Feher | 455/456.1 |

(Continued)

*Primary Examiner*—Khoi Tran
*Assistant Examiner*—Jorge O Peche
(74) *Attorney, Agent, or Firm*—Daniel M. Barbieri

(57) ABSTRACT

A designated function or "golden" slot for implementing and managing re-configurable SDR modules is provided. In an embodiment, the slot includes at least one radio frequency (RF) front end for providing an interface with at least one antenna. In addition, the slot may include at least one slot modem coupled to the RF front end for implementing at least one designated function and at least one input/output (I/O) module coupled to the slot modem. The designated function or "golden" slot is capable of implementing and managing the at least one designated function in a re-configurable module during standard and emergency operations.

22 Claims, 3 Drawing Sheets

U.S. PATENT DOCUMENTS

| | | | |
|---|---|---|---|
| 2007/0032250 A1* | 2/2007 | Feher | 455/456.2 |
| 2007/0032266 A1* | 2/2007 | Feher | 455/553.1 |
| 2007/0032832 A1* | 2/2007 | Feher | 607/32 |
| 2007/0079012 A1* | 4/2007 | Walker | 709/249 |
| 2007/0080781 A1* | 4/2007 | Ginzburg et al. | 340/7.21 |
| 2007/0099585 A1* | 5/2007 | Trachewsky et al. | 455/127.4 |
| 2007/0202890 A1* | 8/2007 | Feher | 455/456.1 |
| 2007/0211689 A1* | 9/2007 | Campero et al. | 370/351 |
| 2008/0080631 A1* | 4/2008 | Forenza et al. | 375/260 |

* cited by examiner

US 7,551,988 B1

METHOD OF SOFTWARE DEFINED RADIO (SDR) WAVEFORM/FUNCTION MANAGEMENT

CROSS REFERENCE TO RELATED APPLICATIONS

The present application is related to U.S. patent application Ser. No. 11/196,551 entitled "Method And Apparatus For Implementing And Managing Avionics Functions," filed Aug. 3, 2005 which is herein incorporated by reference in its entirety.

FIELD OF THE INVENTION

The present invention relates generally to the field of avionics and more particularly, to a system and method of software defined radio (SDR) waveform/function management.

BACKGROUND OF THE INVENTION

Presently available commercial and military aircraft typically employ a suite of radios to perform specific communication, navigation, surveillance, and other aircraft control operations. A limitation associated with such design is that multiple radios must be utilized so that the desired operations may be performed. Software Defined Radios (SDRs) have the potential to decrease the number of radios needed on a given aircraft to perform the desired operations by changing the configuration of the radios during the mission or flight to meet the operational needs for the current phase of the mission (or flight).

A SDR allows multiple software modules implementing different standards to co-exist within one system. As such, the SDR is reconfigurable in which dynamic selection of various parameters is possible by selecting the desired software module. This feature is advantageous over a complete hardware based radio system in which parameters for each of the functional modules are often fixed.

Although the use of SDRs may decrease the overall number of radios necessary to perform aircraft operations, currently configured SDRs may not be able to meet the operational, regulatory, certification, or other mission requirements during failure/emergency conditions, like minimum power (e.g., battery-only operation) or with failures of the re-configuration control mechanism or common processing/power supply elements, and the like. Due to regulatory, certification, or other mission requirements, the benefit of re-programmable modules may be limited unless the system configuration (including re-configurations) may be proven to be robust for meeting the requirements during all phases of the mission including rare failure/emergency conditions.

Therefore, it would be desirable to provide a system and method for SDR waveform/function management which is capable of meeting operational, regulatory, certification, and other requirements during all phases of a mission.

SUMMARY OF THE INVENTION

In accordance with a first aspect of the present invention, a designated function or "golden" slot for implementing and managing re-configurable modules is provided. In an embodiment, the slot includes at least one radio frequency (RF) front end for providing an interface with an antenna. In addition, the slot may include at least one slot modem coupled to the RF front end for implementing at least one designated function and at least one input/output (I/O) module coupled to the slot modem. The "golden" slot is capable of implementing and managing the at least one designated function in a re-configurable module during standard and emergency operations.

In accordance with a further aspect of the present invention, a system for implementing and managing a re-configurable module function is provided. In the present aspect, the system may include at least one designated function or "golden" slot for implementing and managing at least one designated function. For example, the at least one "golden" slot includes at least one RF front end for providing an interface with at least one antenna, at least one slot modem coupled to the at least one RF front end, and at least one I/O module coupled to the slot modem. Further, the system may include at least one non-golden slot for implementing and managing at least one re-configurable function. The system configuration allows the "golden" slot to implement and manage the at least one designated function in a re-configurable module during standard and emergency operations.

In accordance with an additional aspect of the present invention, a method for managing a software defined radio (SDR) function is provided. The method may include configuring a SDR cabinet with at least one designated function or "golden" slot. For instance, the at least one "golden" slot may include a RF front end for providing an interface with an antenna, at least one slot modem coupled to the RF front end for implementing the at least one designated function, and at least one I/O module coupled to the slot modem. The method may also include assigning at least one designated function to the "golden" slot.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings. It is to be appreciated that corresponding reference numbers refer to generally corresponding structures.

Figure 1:
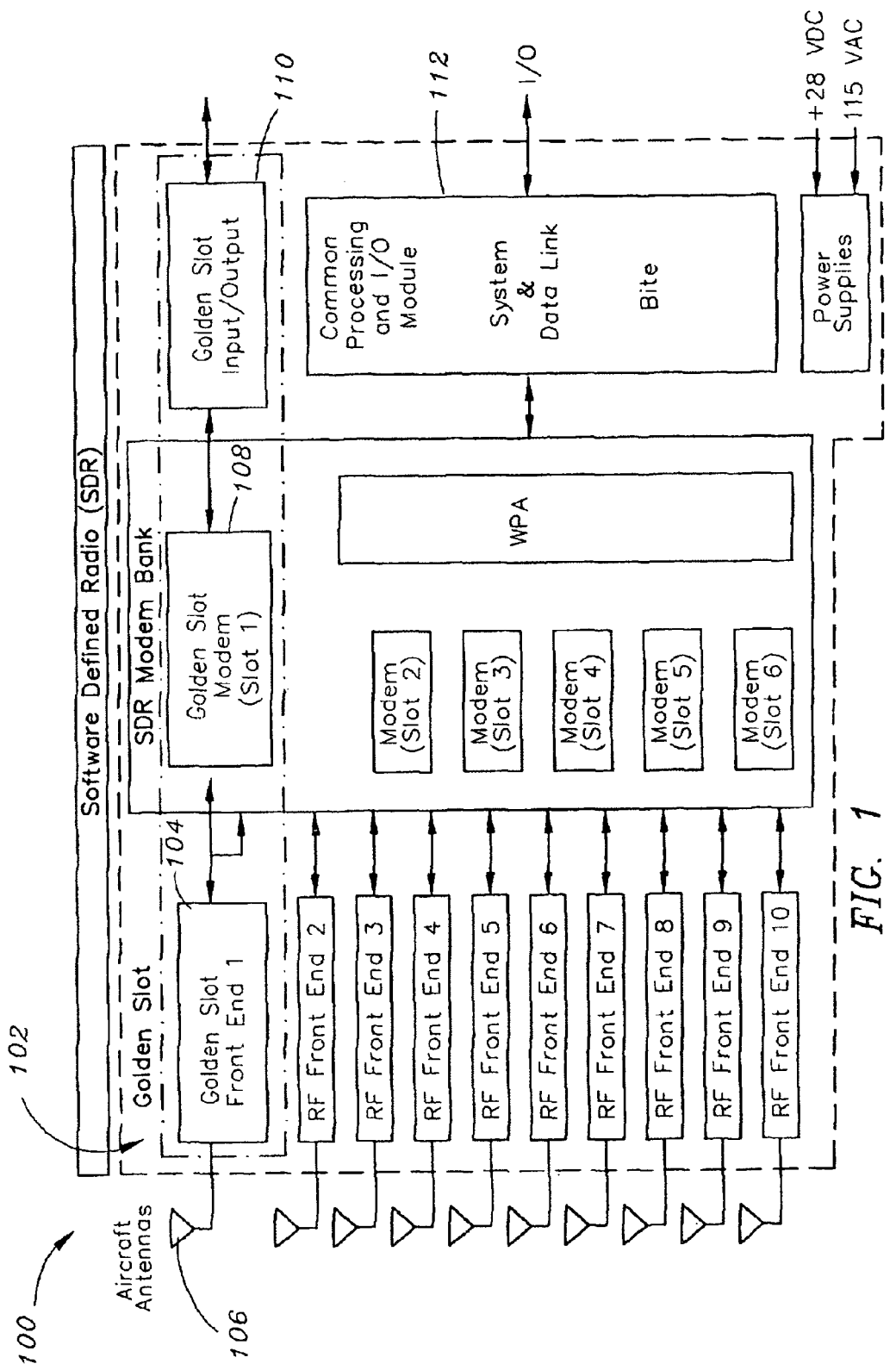
FIG. 1 is a block diagram of a SDR cabinet in accordance with an exemplary embodiment of the present invention, wherein the SDR cabinet includes a designated function or "golden" slot.

In an exemplary embodiment, a "module" may be defined as an element that performs a sub-function within the context of a SDR or modular architecture. As an example, the modules in FIG. 1 consist of each of the following: aircraft antenna, RF Front End, Modem, Input/Output (I/O) Module, and Power Supply. Further, a "slot" may be a set of one or more modules that operate collectively to perform one or more functions. As an example, a "slot" may be allocated to perform one or more Communications, Navigation, and/or Surveillance (CNS) function (e.g., VHF Communications), whereby the function is collectively performed by the following set of modules: antenna, RF Front End, Modem, Input/Output, and Power Supply. Within the scope of the SDR, the antenna may be viewed as an element external to the software defined radio (as illustrated in FIG. 1), or conversely the antenna modules could also be considered within the scope of the SDR system. In addition, a "golden" slot may be defined as a slot within the SDR or modular architecture that is designed and pre-configured to satisfy a set of additional requirements that may not be capable of being satisfied by a "non-golden" slot. The set of additional requirements that are satisfied by implementing the function in a "golden" slot are as necessary to meet the requirements levied on the function typically resulting from user requirements, mission needs, regulations, or approval authority/certification requirements. The attributes of a "golden" slot relative to the other slots in the SDR are that it has been designed or pre-configured to have one or more of the following capabilities: higher availability, higher integrity, higher continuity, higher performance, higher throughput, verified at a higher design assurance level, bounded latency, lower latency, additional functionality, increased fault tolerance, design dissimilarity, alternate power source, additional/alternate Input/Output (I/O) capability, deterministic, bounded fault containment region, non-reconfigurable or reconfigurable by deterministic means (automated or operator selectable). An exemplary use for a "golden" slot in the context of an avionics SDR implementing CNS functions is to allocate a function to the "golden" slot that would remain available, even during emergency conditions of reduced-power (e.g., battery-only) operation. For example, an SDR cabinet may be powered by both a 400 volt AC power source (primary) and a +28 volt DC battery backup source (secondary). During the condition when the primary power source fails, the secondary power source may not have sufficient backup power available to operate the entire SDR functionality for the desired duration. In those instances, the modules in the "golden" slot (or slots) would be the only modules powered to maintain the key function(s) (e.g., VHF Communications) allocated to the "golden" slot(s) during in the time when the primary power source becomes unavailable.

The present invention includes a method and a system for implementing and managing re-configurable modules within a cabinet architecture such as a SDR cabinet in order to meet the operational, regulatory, certification, or other mission requirements not only when all systems are working and available, but also to be capable of satisfying the requirements during failure/emergency conditions. In an exemplary embodiment, one or more functions within the SDR cabinet is implemented in one or more "golden" slots. These "golden" slots are reserved for one or more "key functions." Further, the "key" function or functions that are desired to be available may be one function throughout the entire mission (e.g., mission specific) or the function may change during the mission. For example, current regulatory requirements for commercial aircraft require that the very high frequency (VHF) Air Traffic Control (ATC) communications function be available during all phase of flight when an aircraft operates on minimum power (e.g., battery-only). In such example, the VHF communication function may be designated to be implemented by the "golden" slot. As such, the "golden" slot may be utilized to maintain the VHF communication function when an emergency situation such as battery-only power occurs.

In an alternative embodiment, the "key" function or functions designated to the "golden" slot may be based upon the phase of flight or selected by the flight crew. For instance, during a domestic en route phase of a commercial aircraft flight, a "key" function may include the VHF ATC communication function and/or an Area Navigation function like very high frequency omnidirectional range (VOR) functions. During a precision approach phase, the "key" function(s) designated to the "golden" slot may include the Instrument Landing system (ILS) localizer and glideslope functions. During oceanic en route operations, the "key" function may be satellite communications (SATCOM) and/or global positioning system (GPS) navigation. Thus, the "golden" slot may minimize SDR design complexity as well as the burden on other elements of the cabinet (e.g., the re-configuration control mechanism, processing elements, I/O devices, antenna switches and other common elements).

Referring to FIG. 1, an exemplary SDR cabinet 100 is provided. In the present embodiment, the SDR cabinet 100 integrates communication, navigation, and/or surveillance radio functions in a cabinet. The communication, navigation, and/or surveillance radio functions may include, but are not limited to, high frequency (HF) communications, VHF functions, SATCOM, VOR functions, ILS functions, (e.g., Localizer (LOC), Glideslope (GS), and Marker Beacon (MB)) Microwave Landing System (MLS) functions, Automatic Direction Finder (ADF), Local Area Augmentation System (LAAS), Wide Area Augmentation System (WAAS), Low Range Radar Altimeter (LRRA), VHF Data Broadcast (VDB) functions, distance measuring equipment/tactical air navigation (DME/TACAN) functions, global positioning system/global navigation satellite system (GPS/GNSS) functions, traffic collision and avoidance system (TCAS), transponder functions, planned automatic dependent surveillance-broadcast (ADS-B) functions, and other like functions.

As illustrated in FIG. 1, the SDR cabinet 100 may include a single designated function or "golden" slot 102. The single "golden" slot 102 may contain from zero to n actual functional components depending upon the requirements of the system. In an exemplary embodiment, the only function(s) present in the "golden" slot are critical or "key" functions. Further, the "golden" slot may be designated as a "golden" slot based upon its slot location in the cabinet. It is contemplated that the designated function may be one function or multiple functions. If multiple functions are to be implemented in a "golden" slot, the respective functions may be initiated automatically or flight crew selectable.

The embodiment presented in FIG. 1, includes a single "golden" radio frequency (RF) front end 104 for providing an interface with an aircraft antenna 106. In addition, an exemplary "golden" slot 102 may include at least one "golden" slot modem 108 and at least one "golden" input/output (I/O) module 110. In an embodiment, the "golden" slot modem 108 is capable of running a variety of waveforms/functions and is positioned in slot 1. The one or more "golden" I/O modules 110 implement a "golden" slot 102. Further, the "golden" slot 102 may be controlled by strapping pins on a connector into the module 110. In addition, the module(s) in the "golden" slot 102 may be identical to the other modules in the SDR cabinet or unique to the "golden" slot 102. In an embodiment, a "golden" module is defined by its location (e.g., slot position) or strapping within the "golden" slot 102.

In embodiments, "golden" slots 102 including modules (e.g., I/O modules 110) may be implemented by a software dataload while the aircraft is on the ground and not by a reconfiguration command while in flight. It may also be possible to implement a "golden" slot 102 such that the flight crew is capable of selecting the function (or functions) that are to be performed within the slot. Thus, the flight crew may, for example, select whether the "golden" slot 102 performs a communication function (e.g., VHF communication function) or a navigation function (e.g., GPS).

The SDR cabinet 100 may also include additional slots to perform CNS functions. For example, as illustrated in FIG. 1, nine additional RF front ends (RF Front End 2 through RF Front End 10) and five additional modems (Modem Slot 2 through Modem Slot 6) may be included. The embodiment shown in FIG. 1 is not intended to be limiting of this innovation in which the number of RF front ends, modems, and other components may vary depending upon the requirements of the system. Each RF front end provides an interface with an aircraft antenna and each of the modems is capable of running any of the desired waveforms. However, the "golden" slot modem 108 may be configured to always perform a dedicated function such as VHF communications.

For example, the "golden" RF front end 104 provides the antenna interface for a VHF communication function and "golden" slot modem 108 is dedicated to VHF communications. Since the VHF communications function is required to remain operational during emergencies when only battery power is available, such function may be allocated to the "golden" slot 102. The "golden" slot modem 108 (including its associated "golden" slot RF front end 104 and I/O module 110) may remain operational when the SDR cabinet 100 is powered by either a primary power source (e.g., 400 Hz, 110 volt AC power bus) or a backup power source (e.g., +28 volt DC battery bus); whereas, all the other modules in the SDR may only be powered by a primary power source (e.g., a 400 Hz, 110 volt AC power bus). The VHF function resident in the "golden" slot 102 will remain functional with failure of the common processing, I/O, and/or WPA (Waveform Priority Arbitrator) modules 112 using its alternate I/O interface 110.

In the present example, the "golden" slot modem 108 is configured so that it can not be reconfigured or controlled by a function which controls the SDR's reconfigurable resources such as a waveform priority arbitrator (WPA). As described in detail in U.S. patent application Ser. No. 11/196,551 entitled "Method And Apparatus For Implementing And Managing Avionics Functions," filed Aug. 3, 2005, a WPA may be configured to receive priority control parameters and, based upon a make-up the received priority control parameters, responsively direct the configurable avionics function implementation circuitry to implement a particular priority-based subset (less than all) of the multiple avionics functions. Thus, the WPA may be implemented in a robust deterministic manner to satisfy the needs for high assurance including, for example, satisfying regulatory, certification requirements (e.g., Federal Aviation Administration (FAA), Joint Aviation Authorities (JAA), National Security Agency (NSA) and like certification requirements).

In contrast to the "golden" slot 102, the CNS functions performed on the additional modems may be controlled by the SDR's reconfigurable resources such as by a WPA. It is understood that while "golden" slot modem 108 may not be controlled by such a device it may be monitored by the SDR reconfigurable resource controlling device (e.g., WPA). Such monitoring may allow the SDR reconfigurable resource controlling device to allocate the function(s) of the "golden" slot modem 108 to the additional modems for additional function redundancy/capability or to circumvent failures in the "golden" slot modem 108.

Although the aforementioned example has allocated the VHF communication function to the "golden" slot 102 it is contemplated that a variety of functions may be allocated to such a slot 102 without departing from the scope and spirit of the present invention. The "golden" slot 102 may include functions which assist in satisfying mission requirements when all systems are working and available, but also to satisfy the requirements during failure/emergency conditions. Failure/emergency conditions may include failures of the SDR re-configuration control mechanism, common processing elements, power supply elements, input/output devices, RF front end switching mechanisms, and the like. In addition, the "golden" slot 102 may have alternate interfaces to external systems that are only utilized during special conditions, such as the failure of the primary common processing and I/O module function 112.

It is further contemplated that the "golden" slot 102 may be able to perform one or several functions/waveforms. For instance, more than one "golden" slot may be present in a given SDR cabinet in order to provide for additional "key" designated functional capability. Further, a collection of "golden" modules may be utilized to implement a "golden" slot where one or more functions/waveforms may be performed. In such instance, each of the "golden" slots may include an RF front end, modem, and I/O module. In addition, there may be multiple "golden" slots of modules where the function or functions performed in each slot is deterministic (e.g., slot #1 performs VHF communication functions and slot #2 performs GPS navigations functions).

Figure 2:
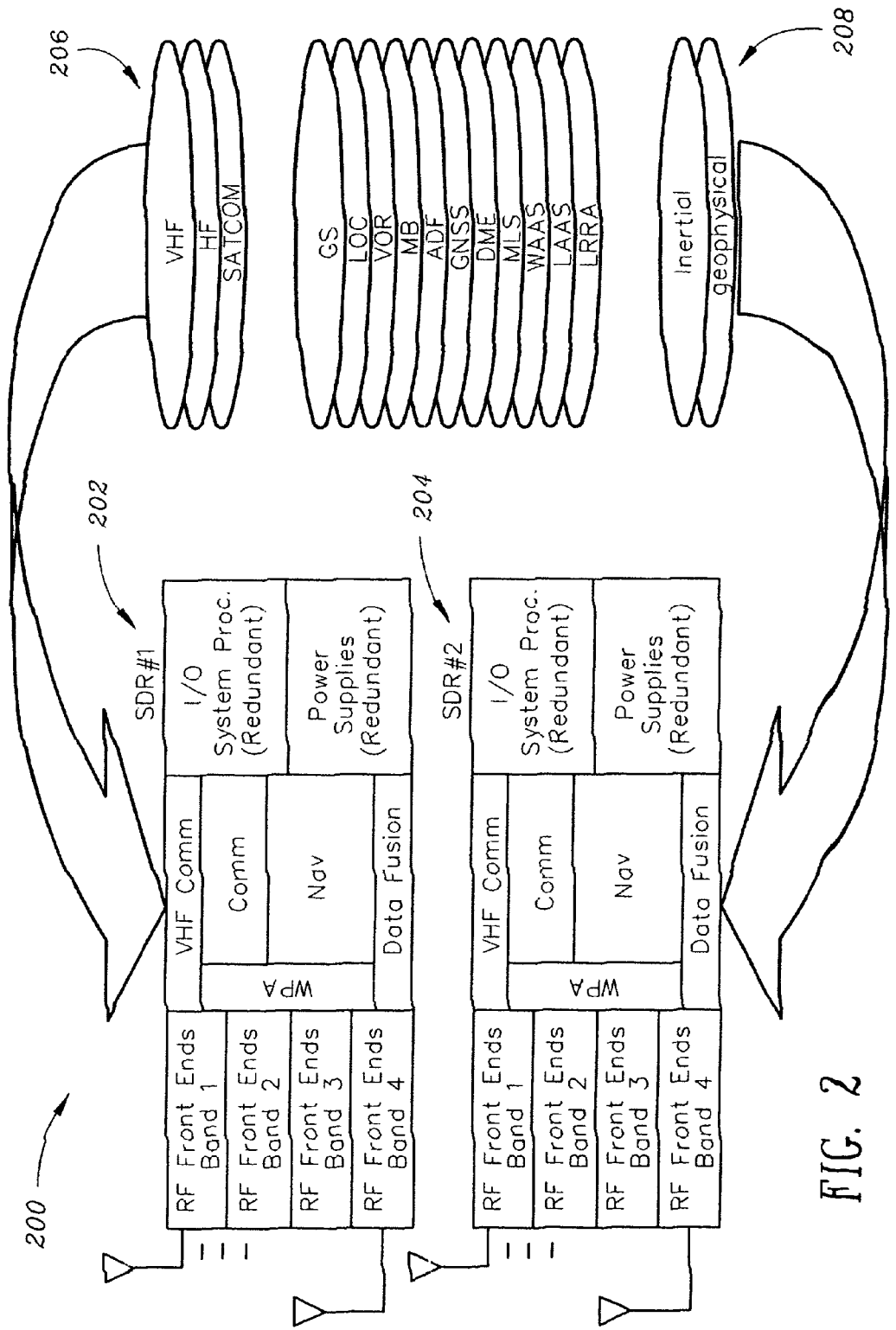
FIG. 2 is a block diagram of a SDR cabinet system in accordance with an exemplary embodiment of the present invention, wherein the SDR cabinet system includes a first SDR cabinet and a second SDR cabinet.

Referring to FIG. 2, a system 200 for implementing and managing SDR waveforms/functions is provided. In the present embodiment, a first SDR cabinet 202 and a second SDR cabinet 204 are included within the system 200. The first SDR cabinet 202 and the second SDR cabinet 204 are each analogous to the SDR cabinet 100 previously described. In an exemplary embodiment, each cabinet includes at least one "golden" slot. Further, each "golden" slot may include at least one "golden" radio frequency (RF) front end for providing an interface with at least one aircraft antenna, at least one "golden" slot modem and at least one "golden" input/output (U/O) module. In addition, each cabinet may include additional slots which include similar components to perform Communication/Navigation/Surveillance (CNS) and data fusion functions. As illustrated in FIG. 2, the first SDR cabinet 202 may be designated to perform a given subset of the CNS and data fusion functions 206 while the second SDR cabinet 204 may be designated to perform a complimentary set of CNS and data fusion functions 208. Exemplary CNS functions illustrated in FIG. 3, include: high frequency (HF), very high frequency (VHF), Satellite Communications (SATCOM), Instrument Landing System (ILS) Glide Slope (GS), ILS Localizer (LOC), VHF Omnidirectional Range (VOR), Marker Beacon (MB), Automatic Direction Finder (ADF), Global Navigation Satellite System (GNSS), Distance Measuring Equipment (DME), Microwave Landing System (MLS), Wide Area Augmentation System (WAAS), Local Area Augmentation System (LAAS), and Low Range Radar Altimeter (LRRA). Exemplary data fusion functions illustrated in FIG. 3 include integration of inertial and geophysical (e.g., Air Data) sensors.

Figure 3:
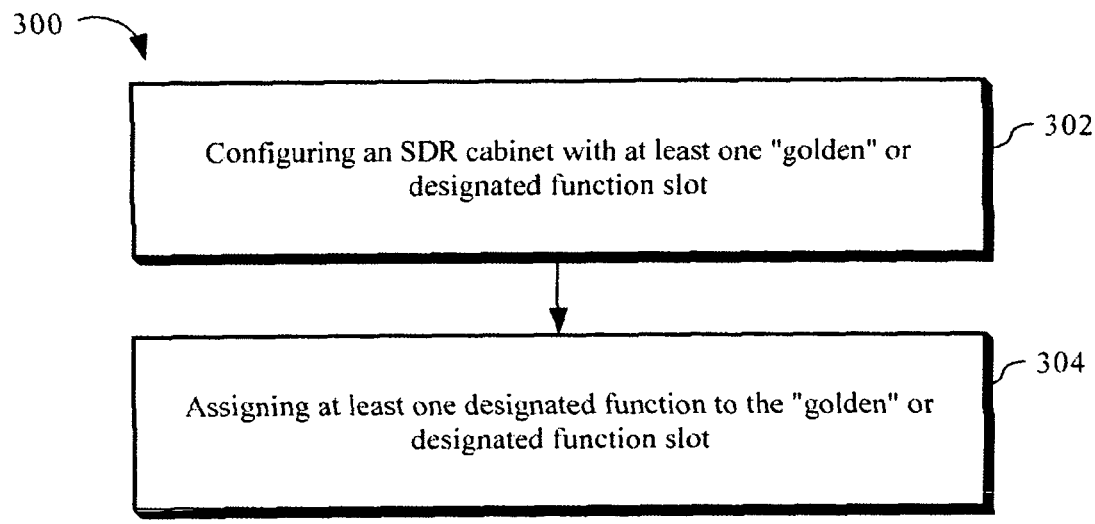
FIG. 3 is a flow diagram of a method of SDR waveform/function management in accordance with an exemplary embodiment of the present invention.

Referring to FIG. 3, a method 300 for managing SDR waveform/functions is provided. In an exemplary embodiment, the method 300 includes configuring a SDR (e.g., a SDR cabinet) with at least one "golden" slot 302. In an embodiment, the at least one "golden" slot may include a "golden" radio frequency (RF) front end for providing an interface with an aircraft antenna, at least one "golden" slot modem and at least one "golden" input/output (I/O) module. Further, the slot may be configured so that it may only be altered while the aircraft is on the ground and not by a reconfiguration command (e.g., from a WPA) while in flight. The method may also include assigning at least one desired/necessary function to the "golden" slot 304. As described previously, the "golden" slot may be configured to perform one or more "key" functions to meet the operational, regulatory, certification, or other mission requirements not only when all systems are working and available, but also to satisfy the requirements during failure/emergency conditions (e.g., battery-only operation). In addition, the designated function may be based upon the phase of the flight or flight crew selectable.

It is contemplated that the disclosed system and method may be implemented within a software-defined communication radio system including Joint Tactical Radio System (JTRS), Future Combat System (FCS), or similar software-defined radios. It is further contemplated that the disclosed system and method may be supported by avionic architectures including Integrated Modular Avionics (IMA) and Multi-Mode Multi-Function Avionics (MMDA). JTRS as well as FCS are a family of software programmable radios that provide the Armed Forces with voice, data and video communications as well as interoperability across the joint battle space. Such system may be not only be integrated on airborne platforms, but on selected maritime, fixed-station, and ground mobile platforms. The disclosed system and method are not, however, limited to these software-defined radios.

It is to be noted that the foregoing described embodiments according to the present invention may be conveniently implemented using conventional general purpose or custom digital computers programmed according to the teachings of the present specification, as may be apparent to those skilled in the computer art. Appropriate software coding may readily be prepared by skilled programmers based on the teachings of the present disclosure, as may be apparent to those skilled in the software art.

It is to be understood that the present invention may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A cabinet architecture, comprising:
   a designated function slot, comprising:
      at least one radio frequency (RF) front end for providing an interface with at least one antenna;
      at least one slot modem coupled to the RF front end for implementing at least one designated function; and
      at least one input/output (I/O) module coupled to the slot modem,
      wherein the designated function slot is capable of implementing and managing the at least one designated function during standard and emergency communication, navigation, and surveillance (CNS) operations; and
   at least one non-designated function slot configured to be controlled by a reconfigurable resource controlling device;
   wherein the designated function slot is designed and pre-configured to satisfy a set of additional requirements which cannot be satisfied by the at least one non-designated function slot, the designated function slot is configured to exclude control by the reconfigurable resource controlling device, and the reconfigurable resource controlling device is configured to perform at least one of monitoring and transferring at least a portion of functionality of the designated function slot to the at least one non-designated function slot.

2. The cabinet architecture as claimed in claim 1, wherein one or more of the designated function slot modules are re-configurable software defined radio (SDR) modules.

3. The cabinet architecture as claimed in claim 2, wherein the functional elements are divided into more than one physical enclosure and are distributed to varying locations within the SDR module.

4. The cabinet architecture as claimed in claim 1, wherein the reconfigurable resource controlling device is a waveform priority arbitrator.

5. The cabinet architecture as claimed in claim 1, wherein the at least one designated function is flight-phase specific.

6. The cabinet architecture as claimed in claim 1, wherein the at least one designated function is selected automatically.

7. The cabinet architecture as claimed in claim 1, wherein the at least one designated function is selected manually.

8. The cabinet architecture as claimed in claim 1, wherein the at least one designated function is implemented by software.

9. The cabinet architecture as claimed in claim 1, wherein the at least one designated function is selected from the group consisting of an aircraft communication function, an aircraft navigation function, an aircraft surveillance function, and an aircraft control function.

10. The cabinet architecture as claimed in claim 1, wherein the set of additional requirements includes at least one selected from: the designated function slot has a higher availability than the non-designated function slot, the designated function slot has a higher integrity than the non-designated function slot, the designated function slot has a higher continuity than the non-designated function slot, the designated function slot has a higher performance than the non-designated function slot, the designated function slot has a higher throughput than the non-designated function slot, the designated function slot has been verified at a higher design assurance level than the non-designated function slot, the designated function slot has a bounded latency and the non-designated function slot does not, the designated function slot has a lower latency than the non-designated function slot, the designated function slot has an increased fault tolerance over the non-designated function slot, the designated function slot has an alternate power source and the non-designated function slot does not, the designated function slot has a bounded fault region and the non-designated function slot does not, the designated function slot has an alternate input/output capability and the non-designated function slot does not, and the designated function slot has an additional input/output capability and the non-designated function slot does not.

11. A system for implementing and managing a re-configurable module function, comprising:
- at least one designated function slot for implementing and managing at least one designated function, the at least one designated function slot including:
  - a radio frequency (RF) front end for providing an interface with an antenna, at least one slot modem coupled to the RF front end, and
  - at least input/output (I/O) module coupled to the slot modem;
- at least one re-configurable function slot for implementing and managing at least one re-configurable function, and
- at least one non-designated function slot configured to be controlled by a reconfigurable resource controlling device;
- wherein the at least one designated function slot is capable of implementing and managing the at least one designated function in a re-configurable module during standard and emergency communication, navigation, and surveillance (CNS) operations, the designated function slot is designed and pre-configured to satisfy a set of additional requirements which cannot be satisfied by the at least one non-designated function slot, the designated function slot is configured to exclude control by the reconfigurable resource controlling device, and the reconfigurable resource controlling device is configured to perform at least one of monitoring and transferring at least a portion of functionality of the designated function slot to the at least one non-designated function slot.

12. The system as claimed in claim 11, wherein the reconfigurable module is a re-configurable software defined radio (SDR) module.

13. The system as claimed in claim 11, wherein the reconfigurable resource controlling device is a waveform priority arbitrator.

14. The system as claimed in claim 11, wherein the at least one designated function is flight-phase specific.

15. The system as claimed in claim 11, wherein the at least one designated function is selected automatically.

16. The system as claimed in claim 11, wherein the at least one designated function is selected manually.

17. The system as claimed in claim 11, wherein the at least one designated function is implemented by software.

18. The system as claimed in claim 11, wherein the at least one designated function is selected from the group consisting of an aircraft communication function, an aircraft navigation function, an aircraft surveillance function, and an aircraft control function.

19. The system as claimed in claim 11, wherein the set of additional requirements includes at least one selected from: the designated function slot has a higher availability than the non-designated function slot, the designated function slot has a higher integrity than the non-designated function slot, the designated function slot has a higher continuity than the non-designated function slot, the designated function slot has a higher performance than the non-designated function slot, the designated function slot has a higher throughput than the non-designated function slot, the designated function slot has been verified at a higher design assurance level than the non-designated function slot, the designated function slot has a bounded latency and the non-designated function slot does not, the designated function slot has a lower latency than the non-designated function slot, the designated function slot has an increased fault tolerance over the non-designated function slot, the designated function slot has an alternate power source and the non-designated function slot does not, the designated function slot has a bounded fault region and the non-designated function slot does not, the designated function slot has an alternate input/output capability and the non-designated function slot does not, and the designated function slot has an additional input/output capability and the non-designated function slot does not.

20. A method for managing a software defined radio (SDR) function, comprising:
- configuring a SDR cabinet with at least one designated function slot, and at least one non-designated function slot configured to be controlled by a reconfigurable resource controlling device, wherein the designated function slot is designed and pre-configured to satisfy a set of additional requirements which cannot be satisfied by the at least one non-designated function slot, the designated function slot is configured to exclude control by the reconfigurable resource controlling device, and the reconfigurable resource controlling device is configured to perform at least one of monitoring and transferring at least a portion of functionality of the designated function slot to the at least one non-designated function slot; and
- assigning at least one designated function to the designated function slot, the designated function slot being configured to implement and manage the at least one designated function in a re-configurable module during standard and emergency communication, navigation, and surveillance (CNS) operations.

21. The method as claimed in claim 20, wherein the at least one designated function slot includes at least one radio frequency (RF) front end for providing an interface with at least one antenna, at least one slot modem coupled to the RF front end for implementing the at least one designated function, and at least one critical input/output (I/O) module coupled to the slot modem.

22. The method as claimed in claim 20, wherein the set of additional requirements includes at least one selected from: the designated function slot has a higher availability than the non-designated function slot, the designated function slot has a higher integrity than the non-designated function slot, the designated function slot has a higher continuity than the non-designated function slot, the designated function slot has a higher performance than the non-designated function slot, the designated function slot has a higher throughput than the non-designated function slot, the designated function slot has been verified at a higher design assurance level than the non-designated function slot, the designated function slot has a bounded latency and the non-designated function slot does not, the designated function slot has a lower latency than the non-designated function slot, the designated function slot has an increased fault tolerance over the non-designated function slot, the designated function slot has an alternate power source and the non-designated function slot does not, the designated function slot has a bounded fault region and the non-designated function slot does not, the designated function slot has an alternate input/output capability and the non-designated function slot does not, and the designated function slot has an additional input/output capability and the non-designated function slot does not.

* * * * *